United States Patent [19]

Alusick et al.

[11] Patent Number: 5,046,032

[45] Date of Patent: Sep. 3, 1991

[54] CALIBRATION BAR

[75] Inventors: Michael P. Alusick, Hartland; Michael J. Kling, III, Meguon; Peter A. Puetz, Waukesha, all of Wis.

[73] Assignee: Bear Automotive Service Equipment Company, Milwaukee, Wis.

[21] Appl. No.: 445,882

[22] Filed: Dec. 1, 1989

[51] Int. Cl.$^5$ .............................................. G01B 7/315
[52] U.S. Cl. ............................. 364/571.02; 364/559; 33/288
[58] Field of Search .................. 364/571.01, 571.02, 364/551.01, 550, 559, 424.05, 575; 356/155; 33/286, 288; 73/1 R, 1 J

[56] References Cited

U.S. PATENT DOCUMENTS

| | | | |
|---|---|---|---|
| 3,953,134 | 4/1976 | Appel et al. | 356/155 |
| 4,095,902 | 6/1978 | Florer et al. | 356/155 |
| 4,204,333 | 5/1980 | van Blerk | 33/288 |
| 4,336,658 | 6/1982 | January et al. | 33/288 |
| 4,381,548 | 4/1983 | Grossman et al. | 364/559 |
| 4,594,789 | 6/1986 | Marino et al. | 356/155 |
| 4,761,749 | 8/1988 | Titsworth et al. | 364/559 |
| 4,931,964 | 6/1990 | Titsworth et al. | 364/559 |

Primary Examiner—Parshotham S. Lall
Assistant Examiner—Michael Zanelli
Attorney, Agent, or Firm—Kinney & Lange

[57] ABSTRACT

A cross toe zero calibration system for use in an automotive vehicle wheel alignment system uses a calibration bar for receiving cross toe measuring head units. A first set of cross toe measurements are taken with the bar in a first position and a second set of cross toe measurements are taken with the bar in a second position. In the second position, the bar is rotated 180° from the first position. The two sets of measurements are averaged to yield zone cross toe angle calibration factors. The combination of rotating the bar and averaging the two sets of measurements nulls out errors introduced into the calibration measurements due to deformities in the bar. The calibration bar is mounted on the main console of an automotive vehicle wheel alignment system. Switches are included which indicate the position of the bar. A computer in the automotive vehicle wheel alignment system prompts an operator through the steps of calibration, accepts the calibration measurements and calculates the calibration factors.

19 Claims, 5 Drawing Sheets

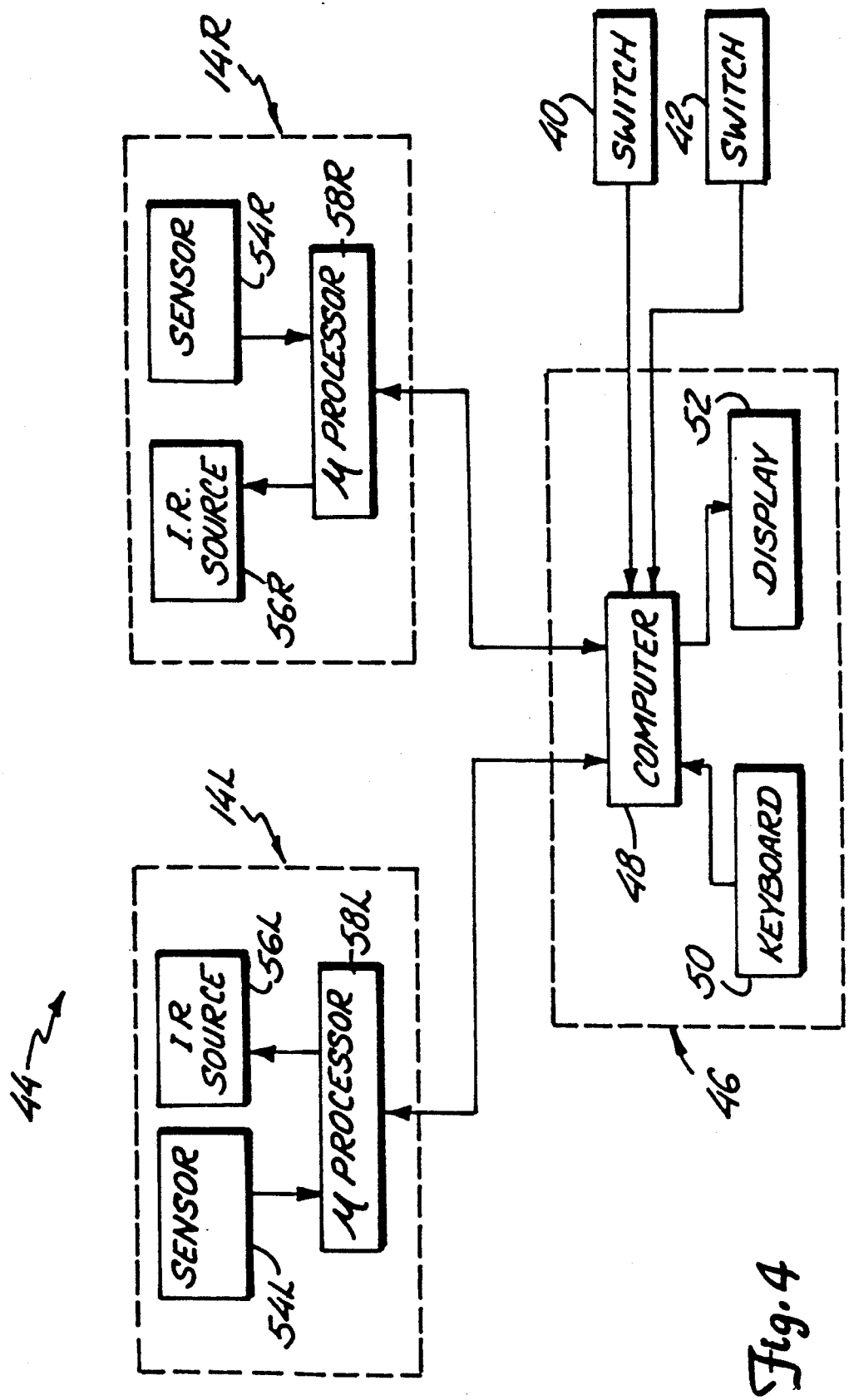

CALIBRATION BAR

BACKGROUND OF THE INVENTION

The present invention relates to wheel alignment. In particular, the invention relates to an improved technique for calibrating sensors in a wheel alignment system.

Proper alignment of the wheels in an automotive vehicle is important for proper handling of the vehicle and proper tire wear. In addition, proper alignment of the wheels will decrease fuel consumption as well as increase vehicle safety. The wheel alignment parameters which are measured and adjusted in order to achieve proper wheel alignment are camber, caster, steering axis inclination and toe.

The static toe angle of a wheel, at a specified wheel load or relative position of the wheel center with respect to a sprung mass, is the angle between a longitudinal axis and a line of intersection of wheel plane and road surface. The wheel is "toed-in" if the forward portion of the wheel is turned toward a central longitudinal axis of the vehicle, and "toed-out" if turned away. Accurate toe adjustment cannot be attained without properly calibrated measuring instruments.

In measuring toe angle, measuring devices ("head units") are clamped onto the four wheels of the vehicle under test. On each side of the vehicle, the head units measure the front to back and back to front angles between each pair of wheels. The head units also measure the side-to-side angles between the front or back pair of left and right wheels. This angle is called the cross toe angle. U.S. Pat. No. 4,594,789 issued June 17, 1986 to Marino et al entitled "Wheel Alignment System" and U.S. Pat. No. 4,095,902 issued June 20, 1978 to Florer et al. entitled "Automobile Wheel Alignment Device and Method" are incorporated by reference. Both patents show a wheel alignment system using head units to measure cross toe angles.

In measuring cross toe angle, the head units must be properly calibrated to produce accurate measurements. Typically, this calibration is done at the factory during manufacture of the head unit. During operation of the wheel alignment system, however, the cross toe head units can change from the factory calibrated setting. This is caused by physical changes in the shape of the head units as well as drift in the electrical components. The operating environment of the typical service station where wheel alignment equipment is used is very stressful on precision measurement equipment. Head units are often bent, dropped, exposed to temperature extremes or otherwise stressed.

Should an operator of the wheel alignment system suspect that a head unit is out of calibration, a technician must be summoned to perform calibration tests. The technician must bring calibration equipment which is extremely precise. The process of recalibrating a head unit is involved and must be performed by a trained operator. Although cumbersome, the calibration equipment must be brought to the service station by the technician each time calibration is checked.

Recalibration also results in a significant down time for the wheel alignment equipment. If the operator suspects a calibration problem and summons a technician, the technician must schedule a time to bring the calibration equipment on site to recalibrate the alignment system. This can cause a delay during which the wheel alignment system is taken out of service and does not produce revenue for the service station. Ironically, the technician may find that the suspect head unit was not out of calibration in the first place.

Calibration equipment for cross toe head units in an automotive vehicle wheel alignment system which is inexpensive, easy to use and robust would be a significant contribution to the art.

SUMMARY OF THE INVENTION

The cross toe head unit calibration bar system of the present invention uses a calibration bar to calibrate the cross toe head units. The calibration system is inexpensive and easy to use. The system includes a nulling feature in which measurement errors which arise from bends or deformities in the bar are nulled out of the calibration measurements.

In the present invention, a calibration bar is mounted in a horizontal plane, typically directly to the main console of the automotive vehicle wheel alignment equipment. The bar is adapted for mounting the cross toe head units, one on each end of the bar. The cross toe head units are clamped on the calibration bar in the horizontal plane using a level. Cross toe measurements are taken between the two cross toe head units. The head units are unclamped from the bar, and the bar is rotated 180°. The cross toe head units are again clamped on the bar in the horizontal plane using the level. A second set of cross toe angle measurements are taken. A computer system averages the two sets of cross toe measurements to calculate a zero angle calibration or correction factor for the cross toe measurements. This average value is the signal level output from a head unit when the head units are in direct alignment and the cross toe angle is zero. By rotating the bar 180° and averaging the two measurements, bends and deformities in the bar are nulled out of the calculation. The only remaining offset in the calibration measurements is due to the two cross toe head units. Even severe deformities in the bar (such as might occur if service personnel sit on the calibration bar, use the calibration bar as a crowbar or otherwise stress the calibration bar) are nulled.

The steps of calibration may be implemented in a computer system such as that used in the automotive vehicle wheel alignment system. The calibration bar system is mounted directly on a main console of the wheel alignment system. The computer system instructs the operator, step-by-step, through the calibration processing on a display such as a CRT. The computer uses position switches to sense the position of the bar. The computer records the two sets of readings and calculates the average value for zero toe angle calibration. The average value is stored in the computer system for use during wheel alignment. The computer informs the operator if the alignment between the two head units is so far out of calibration that the operator must summon a technician.

Using the present invention, if the operator suspects that the cross toe head units are not calibrated, the operator can immediately take a calibration measurement to recalibrate the cross toe head units. The invention is easy to operate, rugged and eliminates extensive down time for the wheel alignment system.

BRIEF DESCRIPTION OF THE DRAWINGS

FIG. 4 is a block diagram of a computerized cross toe calibration system in an automotive vehicle wheel alignment system.

DETAILED DESCRIPTION OF THE PREFERRED EMBODIMENTS

Figure 1:
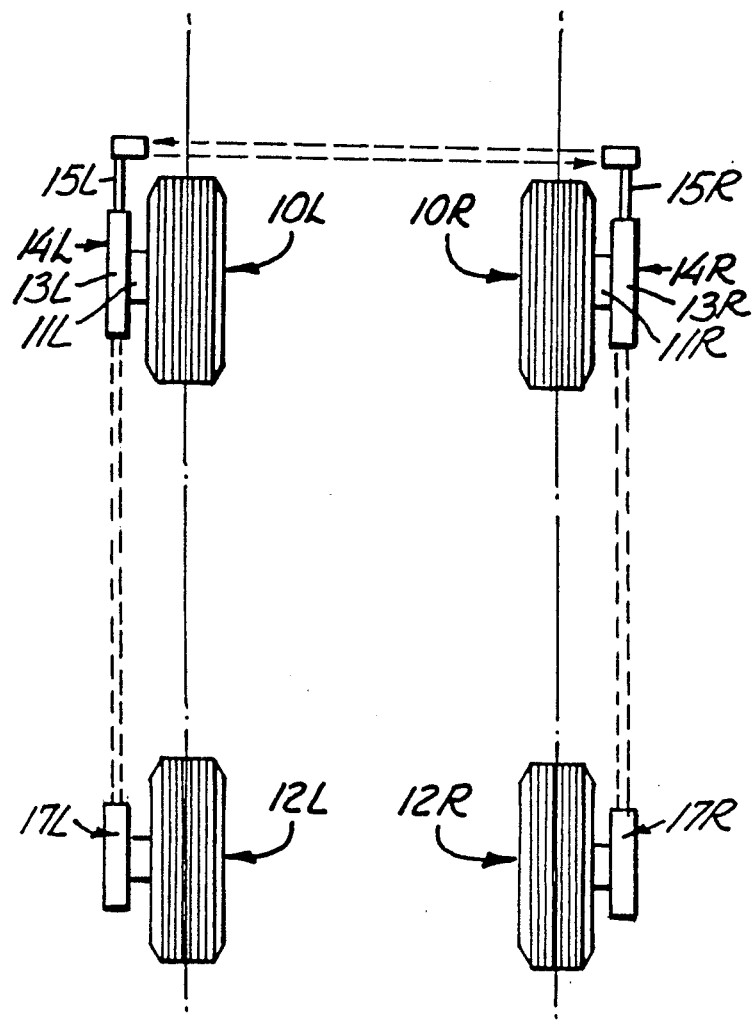
FIG. 1 shows the wheels of an automotive vehicle including front cross toe head units.

FIG. 1 shows front right and left wheels 10L and 10R, and rear right and left wheels, 12R and 12L of an automotive vehicle, respectively. A left head unit 14L is attached to front left wheel 10L. A right head unit 14R is attached to right front wheel 10R. Each head unit 14L and 14R includes a mount 11L and 11R, a body 13L and 13R and an arm 15L and 15R, respectively. An infrared source or transmitter and an infrared sensor (not shown in FIG. 1) is mounted in each arm 15L and 15R. The infrared sensor is capable of measuring the angle of incidence of infrared radiation striking the sensor. Each infrared source is aimed at the sensor in the opposing head unit, as shown by the arrows in FIG. 1. Head units 14L and 14R with head units 17L and 17R, respectively, mounted to rear wheel 12L and 12R are used to measure tracking angles. The head units 14L and 14R provide information relating to the cross toe angle of the front wheels 10R and 10L. If one of the head units 14L or 14R becomes deformed or the electronics in the head unit change from factory specifications, the sensor outputs may no longer accurately correlate to the cross toe angle. Should this occur, recalibration of the head unit is necessary. The calibration bar in the calibration system is used to simulate a pair of wheels whose cross toe angle is zero. When properly calibrated, head units 14L and 14R should measure zero cross toe angle when clamped on the calibration bar. This would not be a problem if the bar were perfectly straight. Even a slight bend in the bar, however, will introduce an error into the calibration system. The present invention nulls out such errors.

Figure 2:
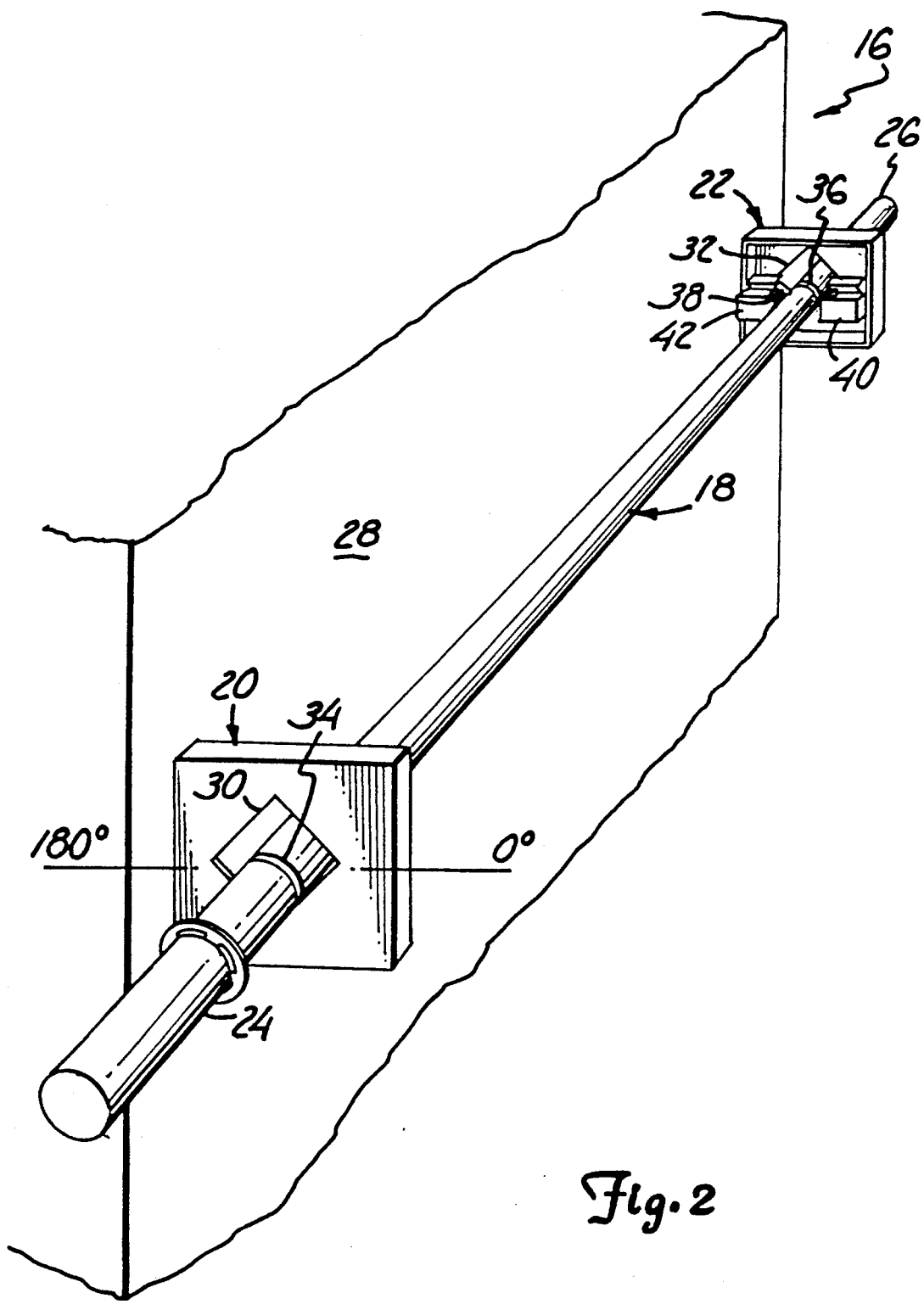
FIG. 2 is a perspective view of a calibration bar in accordance with the present invention.

FIG. 2 is a perspective view of a calibration bar system 16 in accordance with the present invention. Calibration bar system 16 includes a calibration bar 18 and brackets 20 and 22. Bar 18 includes mounting areas 24 and 26. Brackets 20 and 22 are mounted to a support structure 28 (which is, for example, a portion of a main console of a wheel alignment system). Each bracket 20 and 22 includes an aperture 30 and 32, respectively, for receiving bar 18. Bar 18 includes grooves 34 and 36. Grooves 34 and 36 are adapted for being received in the edges of apertures 30 and 32, respectively. Grooves 34 and 36 stabilize bar 18 in the horizontal, vertical and axial directions but allow bar 18 to rotate. Bar 18 also includes a wiper 38 for engaging switches 40 and 42, which are carried by bracket 22.

Bar 18 can be rotated in brackets 20 and 22 between a 0° position and a 180° position as shown in FIG. 2. In the 0° position, wiper 18 actuates switch 40, which indicates bar 18 is at the 0° position. Switch 40 also acts as a stop to secure the bar 18 and a clamp to prevent further turning of bar 18 beyond the 0° point. When rotated completely in the other direction, wiper 38 actuates switch 42, which indicates bar 18 is at the 180° position. Switch 42 also acts as a stop and a clamp to secure bar 18 and to prevent further rotation of bar 18 beyond the 180° position. Brackets 20 and 22 are mounted to support structure 28 so that bar 18 is in the horizontal plane with respect to ground. Left and right cross toe head units 14L and 14R may be clamped to bar 18 at gripping portions 26 and 24, respectively.

Figure 3:
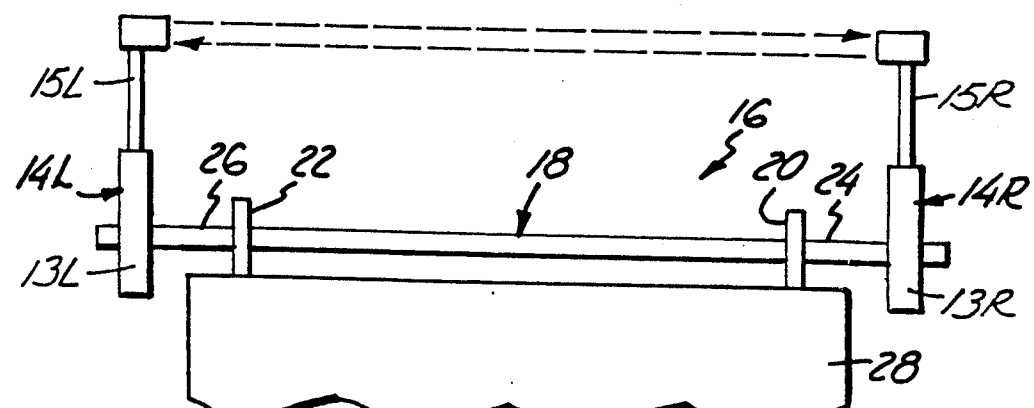
FIG. 3 is a top plan view of the calibration bar including cross toe head units.

FIG. 3 shows left cross toe head unit 14L and right cross toe head unit 14R clamped to mounting areas 26 and 24 using set screws (not shown), respectively, of bar 18. FIG. 3 is a top plan view looking down on calibration bar 16. Cross toe head units 14L and 14R each include a level (not shown) such as a bubble/fluid vial for leveling head units 14L and 14R in the horizonal plane.

In operation, to check the calibration and recalibrate head units of 14L and 14R, an operator clamps head units 14L and 14R on bar 18 as shown in FIG. 3. Bar 18 should be rotated to the 0° position shown in FIG. 2 prior to clamping head units 14L and 14R on bar 18. Head units 14L and 14R are clamped to bar 18 at mounting areas 26 and 24, respectively, by sliding head units 14L and 14R onto gripping portions 26 and 24 and tightening set screws (not shown). Infrared sensors and sources in each head unit 14L and 14R are energized and angle measurements are taken between the two head units 14L and 14R.

In a system having no deformities, bar 18 would be perfectly straight and head units 14L and 14R would have no deformities so that the two head units would point directly at each other. If this were the case, any calibration errors would be due solely to the electronics in head units 14L and 14R. If either head unit 14R or 14L is slightly bent, additional errors are introduced into the angle measurement. If bar 18 is perfectly straight, a single set of angle measurements may be taken between head units 14L and 14R to calculate the correction factor used to calibrate a 0° toe angle between the two head units. However, even a slight bend in bar 18 will introduce errors into the calibration measurement because head units 14L and 14R will not be directly aimed at each other.

Calibration bar system 16 provides a simple solution to the problem of bar-induced errors. Head units 14L and 14R are clamped onto bar 18. A first set of cross toe angle measurements are taken from head units 14L and 14R with the bar rotated to the 0° position shown in FIG. 2. Next, head units 14L and 14R are unclamped from mounting areas 26 and 24, respectively, and bar 18 is rotated by the operator to the 180° position. Head units 14L and 14R are again clamped on mounting areas 24 and 26, respectively, and a second set of cross toe angle measurements are taken between the two head units. The two sets of measurements are averaged to yield correction or calibration factors used to calibrate head units 14L and 14R. The calibration factors indicate the output of head units 14L and 14R when measuring a 0° cross toe angle. The steps of rotating the bar and averaging the measurements null out any errors introduced into the measurements due to deformities in bar 18. Since the two measurements are taken with the bar rotated 180° apart, any errors introduced into the first set of measurements by bends in the bar will be cancelled out in the second set of measurements because the error in the second set of measurements will be introduced in the direction opposite the error in the first set of measurements.

FIG. 4 shows a block diagram of a computerized calibration system 44 in accordance with the present invention. In a preferred embodiment of the present invention, calibration system 44 uses the same circuitry used in an automotive vehicle wheel alignment system, except for switches 40 and 42. In FIG. 4, head units 14L and 14R are connected to a console 46. Console 46 includes computer 48, keyboard entry system 50 and display 52. Each head unit 14L and 14R includes infrared sensors 54L and 54R, infrared sources 56L and 56R and microprocessors 58L and 58R, respectively. Switches 40 and 42 shown in FIG. 2 are also connected to computer 48 of console 46 in FIG. 4. Microprocessors 58L and 58R control infrared sources 56L and 56R and receive infrared sensory information from infrared sensors 54L and 54R. Microprocessors 58L and 58R use this information to calculate the angle between head units 14L and 14R. This information is sent to computer 48. Computer 48 receives operating instructions from the operator through keyboard 50 and displays information through display 52. Computer 48 senses the 0° position and the 180° position of bar 18 using switches 40 and 42 respectively. Using the computerized calibration system 44 of FIG. 4, the operator is lead through the steps of calibrating head units 14L and 14R through display 52. Display 52 can also display the calibration factors.

Figure 5:
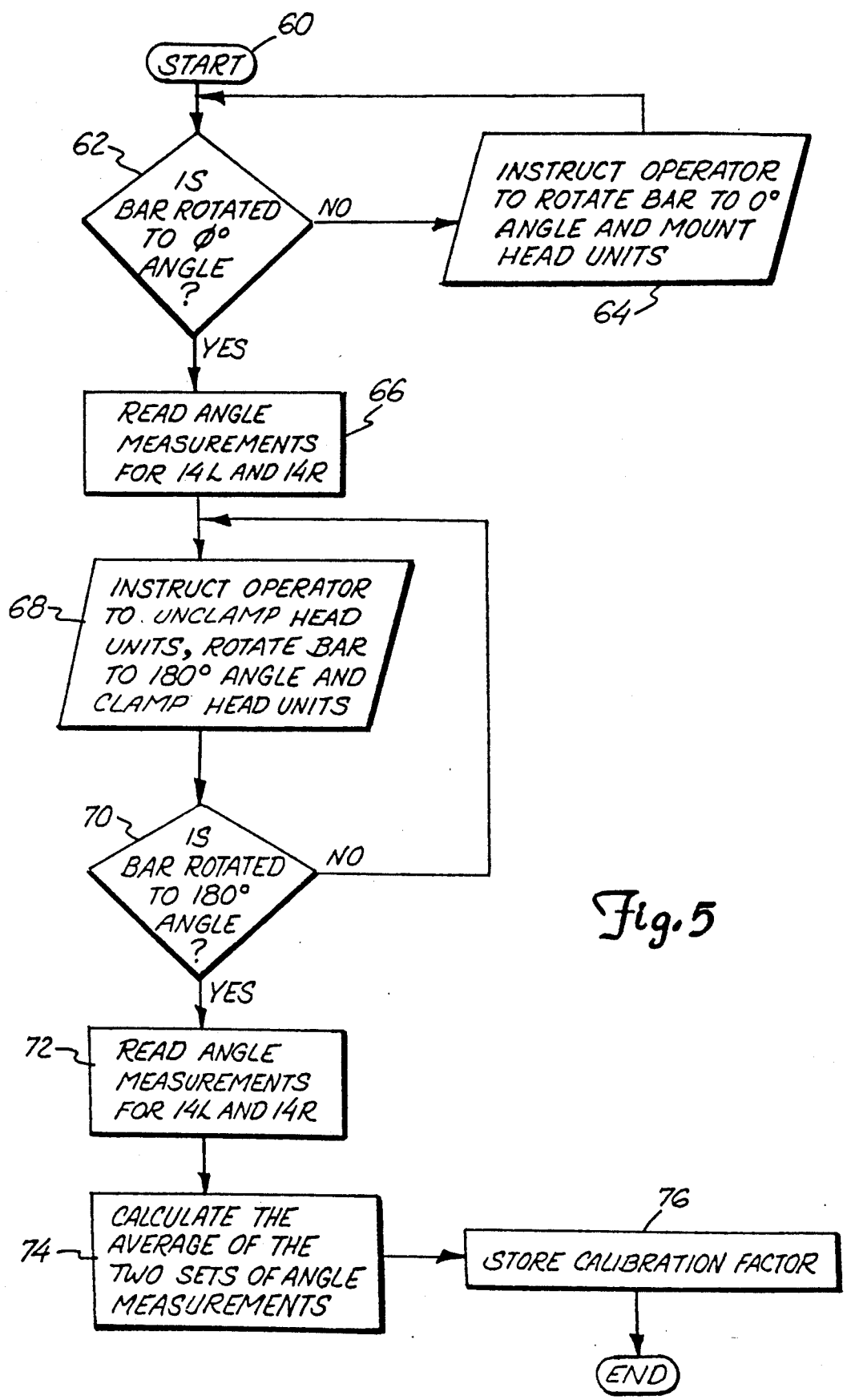
FIG. 5 is a flow chart of the method of the present invention.

FIG. 5 is a flow chart for the computerized calibration system 44 of FIG. 4 used to lead an operator through the steps of calibrating 0° cross toe angle for head units 14L and 14R. The calibration process is initiated at START 60. Computer 48 checks to see if bar 18 is rotated to the 0° position as indicated by switch 40, at cell 62 in FIG. 5. If bar 18 is not rotated to the 0° angle, the operator is instructed to do so at cell 64. If the bar is rotated to the 0° angle (and the operator has indicated that the two head units are clamped to the bar and leveled) a cross toe angle measurement is read for each head unit 14L and 14R at cell 66. This information is stored in computer 48. Next, at cell 68 the operator is instructed to unclamp head units 14L and 14R, rotate bar 18 to the 180° angle position and clamp head units 14L and 14R to bar 18. This step is repeated by cell 70 until switch 42 indicates the bar is in the 180° position (and the operator has indicated the head units are clamped to bar 18 and leveled). A second set of cross toe angle measurements are taken at cell 72 from head units 14L and 14R. These measurements are also stored in computer 48. At cell 74, computer 48 calculates the average between the two sets of calibration angle measurements taken and stored at cells 66 and 72. These average values are stored as calibration or correction factors for use in automotive vehicle cross toe angle measurements at cell 76. For example, if the average for one of the two head units yields 0.5°, this indicates that the head unit is offset from zero by 0.5° and that all measurements using that head unit should be so compensated. The steps of rotating bar 18 and averaging the two sets of cross toe angle measurements cancel out any errors introduced through deformities in bar 18.

Figure 6:
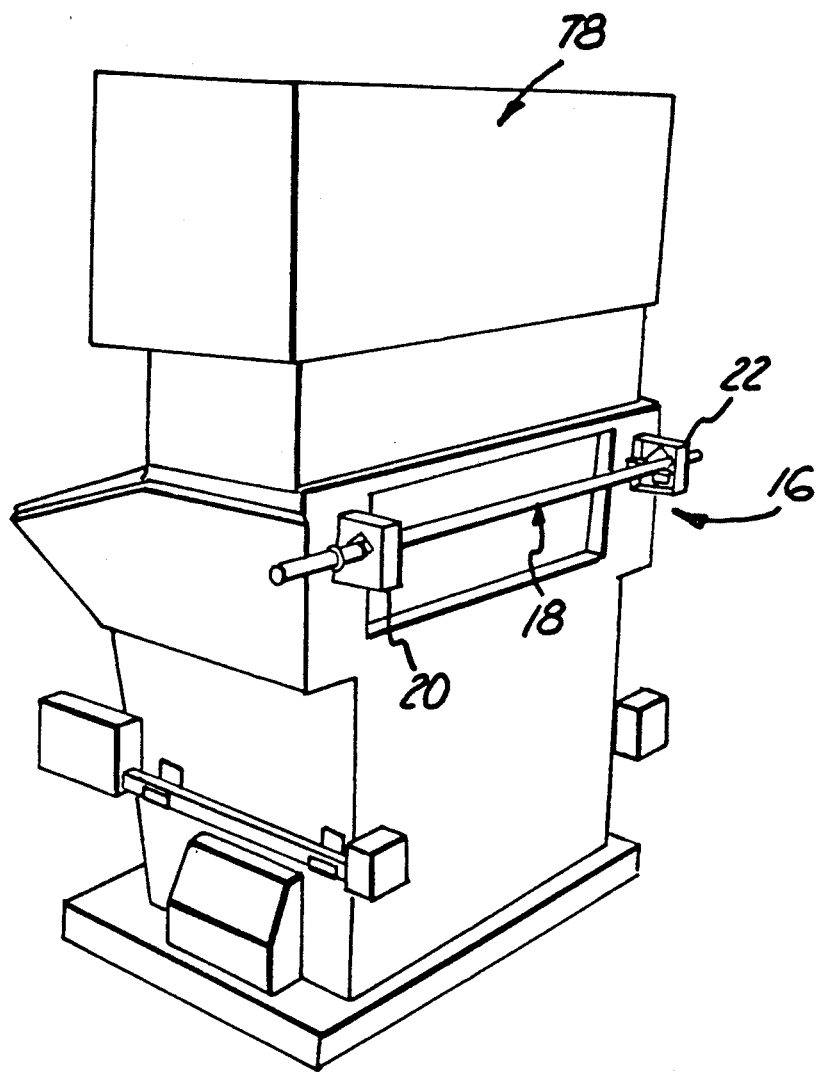
FIG. 6 shows a perspective view of the calibration bar of the present invention mounted on a wheel alignment unit.

In a preferred embodiment of the present invention, calibration bar system 16 is mounted directly on main console 78 for an automotive vehicle wheel alignment system. This configuration ensures that zero cross toe calibration can be immediately taken by an operator, should the operator suspect that the head units have changed from their factory calibrated settings. Using the configuration shown in FIG. 6, the same computer used to operate the wheel alignment system can also be programmed to run the calibration system and prompt the operator through the steps of zero toe angle calibration.

Although the present invention has been described with reference to preferred embodiments, workers skilled in the art will recognize that changes may be made in form and detail without departing from the spirit and scope of the invention. For example, the head units can be calibrated one at a time or calibration measurements can be taken with the bar positioned at angles other than 0° and 180°.

What is claimed is:

1. An apparatus for correcting for errors in calibration equipment used in calibrating cross toe angle measurements in wheel alignment system having a left head unit and a right head unit which provide cross toe angle measurement signals comprising:
   a support structure;
   bracket means mounted to the support structure;
   a bar rotatably mounted in the bracket means, the bar rotatable between a first position and a second position and the bar includes a left mounting area adapted for receiving the left head unit and a right mounting area adapted for receiving the right head unit;
   means for accepting first cross toe angle measurement signals from the left head unit and the right head unit when the bar is in the first position and second cross toe angle measurement signals from the left head unit and the right head unit when the bar is in the second position; and
   means for correcting for errors associated with the bar and for calculating a cross toe angle calibration factor for the left and right head units based upon the first and second cross toe angle measurement signals wherein the cross toe angle calibration factor is independent of deformities in the bar.

2. The apparatus of claim 1 including means for using the calibration factor to measure cross toe angle in an automotive vehicle wheel alignment system.

3. The apparatus of claim 1 wherein the means for calculating the cross toe angle calibration factor comprises a means for calculating an average of the first and second cross toe angle measurement signals.

4. The apparatus of claim 1 wherein the first cross toe measurement signals are accepted by the means for accepting with the bar at the first position and the second cross toe measurement signals are accepted by the means for accepting with the bar at the second position.

5. The apparatus of claim 1 including means for displaying the calibration factor.

6. The apparatus of claim 1 and further including switch means for indicating when the bar is in the first and second positions.

7. The apparatus of claim 1 wherein the support structure is a main console unit of an automotive vehicle wheel alignment system.

8. The apparatus of claim 1 including means for prompting an operator through the steps of calibrating cross toe angle.

9. The apparatus of claim 1 wherein the first and second positions are 180° apart.

10. A method for correcting for errors in calibration equipment used in calibrating cross toe angle measurements in a wheel alignment system having a left head unit and a right head unit which provide cross toe angle measurement signals, comprising:

rotating a rotatable bar to a first position;

clamping the left head unit and the right head unit to the rotatable bar;

accepting first cross toe angle measurement signals from the left and right head units;

unclamping the left head unit and the right head unit from the bar;

rotating the bar to a second position 180° from the first position;

clamping the left head unit and the right head unit to the bar;

accepting second cross toe angle measurement signals from the left and right head units; and correcting for errors associated with the rotatable bar and calculating a cross toe angle calibration factor based upon the first and second cross toe angle measurement signals wherein the cross toe angle calibration factor is independent of deformities in the rotatable bar.

11. The method of claim 10 including displaying the cross toe angle calibration factor.

12. The method of claim 10 including using the calibration factor in cross toe angle wheel measurements of an automotive vehicle to correct measurements made by the left and right head units when mounted on wheels of the automotive vehicle.

13. The method of claim 10 including prompting an operator through the steps of calibrating cross toe angle.

14. The method of claim 10 including sensing the position of the bar.

15. The method of claim 10 wherein the bar is mounted on a main console in an automotive vehicle wheel alignment system.

16. The method of claim 10 wherein calculating the calibration factor comprises calculating a average of the first and second cross toe angle measurement signals.

17. The method of claim 10 including simultaneously calibrating cross toe angle measurements from a second head unit.

18. In an automotive vehicle wheel alignment system having a left and a right head unit for mounting to a left and a right wheel in an automotive vehicle and producing left and right cross toe angle measurements, the wheel alignment system including a main console and a computer system, the left and the right head units connected to the computer system for providing cross toe angle measurements to the computer system, the improvement comprising:

bracket means mounted to a mounting panel of the main console wherein the main console includes a front panel which carries a display output and a keyboard input and the mounting panel of the main console is on a side of the main console which is opposite the front panel;

a bar rotatably mounted to the bracket means, the bar rotatable between a first and a second position and the bar including a left and a right mounting area adapted for receiving the left and the right head units;

means for accepting first cross toe angle measurement signals from the left head unit and the right head unit when the bar is in the first position and second cross toe angle measurement signals from the left head unit and the right head unit when the bar is in the second position; and means for correcting for errors associated with the bar and for calculating a cross toe angle calibration factor for the left and right head units based upon the first and second cross toe angle measurement signals wherein the cross toe angle calibration factor is independent of deformities in the bar.

19. The automotive vehicle wheel alignment system of claim 18 and further including switch means for indicating when the bar is in the first and second positions.

* * * * *